Z. I. PRATT
Sleigh.
No. 113,924. Patented April 18, 1871.
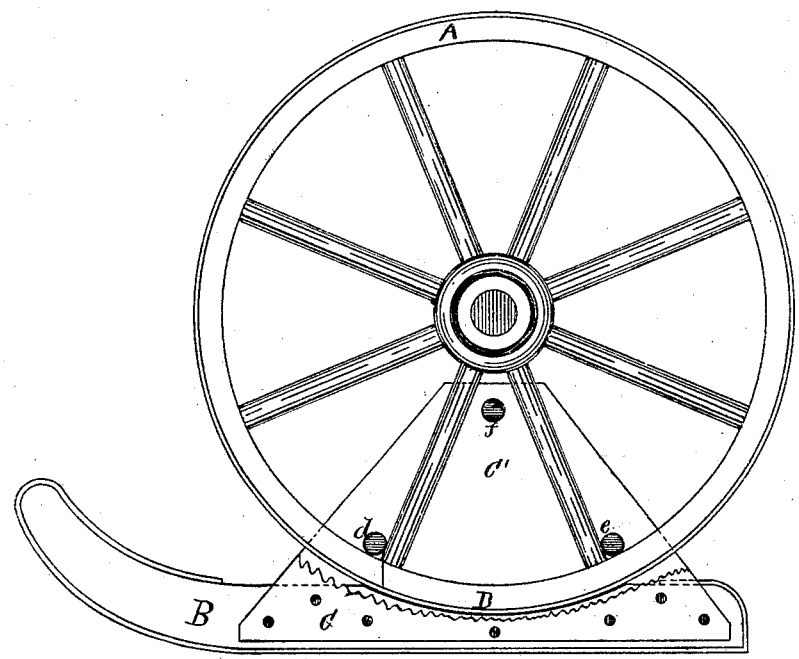
Witnesses-
Inventor.

United States Patent Office.

ZIMRI I. PRATT, OF CHICAGO, ILLINOIS.

Letters Patent No. 113,924, dated April 18, 1871.

---

IMPROVEMENT IN SLEIGH-RUNNER ATTACHMENTS TO WHEEL VEHICLES.

---

The Schedule referred to in these Letters Patent and making part of the same.

---

*To all whom it may concern:*

Be it known that I, ZIMRI I. PRATT, of Chicago, in the county of Cook and State of Illinois, have invented a new and useful Improvement in Sleigh-Runner Attachment to Wheel Vehicles; and I do hereby declare the following to be a full, clear, and exact description thereof, which will enable others skilled in the art to which my invention appertains to make and use the same, reference being had to the accompanying drawing forming part of this specification, in which—

The figure is a side elevation of a wagon-wheel with my improvement attached thereto, a portion of which is broken away, showing the manner of securing the same.

My invention has for its object to provide an improved attachment to wheel vehicles, by which the same may be readily changed to a sleigh when desired; and to that end, It consists in sleigh-runners the upper surfaces of which are slightly concaved to fit the periphery of the wheel, and to which are attached metal plates coming in contact with and against opposite sides of the spokes, through which plates are passed bolts coming in contact with the inner side of the fellies and outer side of the spokes, by which means the runners are prevented from turning.

In the drawing—

A represents the wheel, which is made in the ordinary manner.

B is the runner, which is curved at its forward extremity and provided with metal shoes in the usual manner and form.

C and C' are metal plates, which are firmly bolted or riveted to the outer sides of the runner, and extend upward to or near the hub of the wheel, and are beveled from their lower and outer extremities upward and inward toward their center, as shown in the drawing.

The upper surface of the runner is slightly concaved, approximating the periphery of the wheel, forming a recess, into which the wheel is fitted, as shown at D.

$d$, $e$, and $f$ are screw-threaded bolts, which pass laterally through said plates, and are so arranged as to compress the same firmly against the sides of the fellies and spokes of the wheel, by which means the proper rigidity laterally is obtained.

The said bolts $d$ and $e$ are so arranged in the plates as to come in contact with and against the upper or inner surface of the fellies and outer sides of the spokes, thus firmly securing the runner in the proper position on the wheel, and in such a manner as to prevent the same from turning.

Having thus described my invention,

What I claim as new, and desire to secure by Letters Patent, is—

In combination with wheel A, the plates C C', bolts $d\ e\ f$, and runner B when said runner is concaved to receive the periphery of the wheel, as described, in connection with the bolts $d$ and $e$ when arranged within the plates and in contact with the inner surface of the fellies and outer side of the spokes, whereby the wheel is prevented from turning, substantially as described.

The foregoing specification of my invention signed by me this 7th day of February, 1871.

ZIMRI I. PRATT.

Witnesses:
N. C. GRIDLEY,
N. H. SHERBURNE,